United States Patent
Yoon et al.

(10) Patent No.: US 9,415,382 B2
(45) Date of Patent: *Aug. 16, 2016

(54) POLYLACTIDE RESIN AND PREPARATION METHOD THEREOF

(71) Applicant: LG Chem, Ltd., Seoul (KR)

(72) Inventors: Sung-Cheol Yoon, Daejeon (KR); In-Su Lee, Daejeon (KR); Seong-Woo Kim, Daejeon (KR); Seung-Young Park, Daejeon (KR)

(73) Assignee: LG Chem, Ltd. (KR)

( * ) Notice: Subject to any disclaimer, the term of this patent is extended or adjusted under 35 U.S.C. 154(b) by 170 days.

This patent is subject to a terminal disclaimer.

(21) Appl. No.: 14/027,700

(22) Filed: Sep. 16, 2013

(65) Prior Publication Data

US 2014/0018516 A1     Jan. 16, 2014

Related U.S. Application Data

(62) Division of application No. 13/148,367, filed as application No. PCT/KR2010/000793 on Feb. 9, 2010, now abandoned.

(30) Foreign Application Priority Data

Feb. 9, 2009 (KR) .......................... 10-2009-0010182
May 8, 2009 (KR) .......................... 10-2009-0040123
Aug. 5, 2009 (KR) .......................... 10-2009-0072140

(51) Int. Cl.
C08G 63/08      (2006.01)
C08G 63/85      (2006.01)
(Continued)

(52) U.S. Cl.
CPC ............ *B01J 31/122* (2013.01); *B01J 31/1805* (2013.01); *C08G 63/823* (2013.01); *C08G 63/85* (2013.01); *B01J 2531/0219* (2013.01);
(Continued)

(58) Field of Classification Search
CPC ........................................................ C08G 63/08
USPC .................................................. 528/354–359
See application file for complete search history.

(56) References Cited

U.S. PATENT DOCUMENTS 3,502,722 A    3/1970 Neumann
4,321,394 A    3/1982 Schafer et al.
(Continued)

FOREIGN PATENT DOCUMENTS

CN    1930211 A    3/2007
CN    101415776 A   4/2009
(Continued)

OTHER PUBLICATIONS

Leenslag et al. Makromol. Chem. 1987, 188, 1809-1814.
(Continued)

*Primary Examiner* — Rachel Kahn
(74) *Attorney, Agent, or Firm* — Lerner, David, Littenberg, Krumholz & Mentlik, LLP (57) ABSTRACT

The present invention is directed to an organometallic complex and a catalyst composition capable of producing polylactide resins with improved properties at a higher conversion rate, a method of producing the organometallic complex, polylactide resins having enhanced hydrolysis resistance and heat resistance together with superior mechanical properties, a preparation process therefor, and polylactide resin compositions including the same.

9 Claims, 2 Drawing Sheets

(51) Int. Cl.
   *B01J 31/12*   (2006.01)
   *B01J 31/18*   (2006.01)
   *C08G 63/82*   (2006.01)

(52) U.S. Cl.
   CPC ........... *B01J2531/26* (2013.01); *B01J 2531/42* (2013.01); *Y02P 20/52* (2015.11)

(56) References Cited

U.S. PATENT DOCUMENTS

| | | | |
|---|---|---|---|
| 5,142,023 | A | 8/1992 | Gruber et al. |
| 5,338,822 | A | 8/1994 | Gruber et al. |
| 5,770,682 | A | 6/1998 | Ohara et al. |
| 6,166,169 | A | 12/2000 | Fritz et al. |
| 2004/0014932 | A1 | 1/2004 | Upshaw et al. |
| 2007/0073033 | A1 | 3/2007 | Sato et al. |
| 2009/0062437 | A1 | 3/2009 | Suzuki et al. |
| 2009/0234094 | A1 | 9/2009 | Suzuki et al. |
| 2010/0093888 | A1 | 4/2010 | Endo et al. |

FOREIGN PATENT DOCUMENTS

| | | |
|---|---|---|
| EP | 1736498 A1 | 12/2006 |
| EP | 2116576 A1 | 11/2009 |
| JP | 2001-261797 A | 9/2001 |
| JP | 2005-320471 A | 11/2005 |
| JP | 2008-069271 A | 3/2008 |
| JP | 2008-120872 A | 5/2008 |
| JP | 2008-231285 A | 10/2008 |
| KR | 2008-0053485 A | 6/2008 |
| KR | 2008-0106161 A | 12/2008 |
| WO | 2005-044894 A1 | 5/2005 |
| WO | 2008-102919 A1 | 8/2008 |

OTHER PUBLICATIONS

Witzke et al. Macromolecules 1997, 30, 7075-7085.
Majerska et al. Macromol Rapid Commun 2000, 21, 1327-1332.
Kowalski et al. Macromolecules 2005, 38, 8170-8176.
Degee et al. Journal POlymer Science Part A Polymer Chemistry 1999, 37, 2413-2420.
Degee et al. Macromol. Symp. 1999, 144, 289-302.
Kowalski et al. Macromolecules 2000, 33, 7359-7370.
S.J de Jong et al., "Biodegradable hydrogels based on stereocomplex formation between lactic acid oligomers grafted to dextran", Journal of Controlled Relsese, vol. 72, Issues 1-3, May 14, 2001, pp. 47-56.
European Search Report, EP 10738780.5 dated Jul. 15, 2013.

POLYLACTIDE RESIN AND PREPARATION METHOD THEREOF

CROSS REFERENCE TO RELATED APPLICATIONS

The present application is a divisional of U.S. patent application Ser. No. 13/148,367, filed on Aug. 8, 2011, which is a national phase entry under 35 U.S.C. §371 of International Application No. PCT/KR2010/000793, filed Feb. 9, 2010, published in Korean, which claims the benefit of Korean Patent Application Nos. 10-2009-0010182, filed Feb. 9, 2009; 10-2009-0040123, filed May 8, 2009; and 10-2009-0072140, filed Aug. 5, 2009. The disclosures of said applications are incorporated by reference herein.

BACKGROUND OF THE INVENTION (a) Field of the Invention

The present invention relates to polylactide resins with improved properties, and a preparation process therefor. More specifically, the present invention is directed to an organometallic complex and a catalyst composition capable of producing polylactide resins with improved properties at a higher conversion rate, a method of producing the organometallic complex, polylactide resins having enhanced hydrolysis resistance and heat resistance together with superior mechanical properties, a preparation process therefor, and polylactide resin compositions including the same.

(b) Description of the Related Art

Polylactides (or polylactic acids) are a type of resin including a repeating unit of the following General Formula. Unlike conventional petroleum-based resins, the polylactide resins, which are based on biomass, can utilize renewable resources, and their preparation generates less greenhouse gas, $CO_2$, than the preparation of other conventional resins. Also, not only do they have eco-friendly attributes such as biodegradability by water and microorganisms when being buried, but they also possess suitable mechanical strength comparable to the conventional petroleum-based resins.

[General Formula]

The polylactide resins have been used mainly for disposable packages/containers, coatings, foams, films/sheets, and fibers. Recently, more efforts have been made to enhance the properties of the polylactide resins by mixing them with conventional resins such as ABS, polycarbonate, or polypropylene, and then utilizing them in a semi-permanent use such as for exterior materials of cell phones or interior materials of vehicles. However, the polylactide resins tend to biodegrade in and of themselves due to factors such as the catalyst used in their preparation, moisture in the air, and the like, and up to now such drawbacks of their own properties have limited their application.

Previously known processes for preparing the polylactide resins involve either directly subjecting lactic acid to condensation polymerization or carrying out ring opening polymerization with lactide monomers in the presence of an organometallic catalyst. In this regard, the direct condensation polymerization can produce the polymer at a low cost but it is difficult for the resulting polymers to have a high molecular weight in terms of a weight average molecular weight of 100,000 or more, making it difficult to sufficiently ensure the physical and mechanical properties of the polylactide resins. On the other hand, the ring opening polymerization of the lactide monomers entails a higher cost than the condensation polymerization since the lactide monomers should be prepared from lactic acid, but it can produce a polymer having a relatively high molecular weight and is advantageous in controlling the polymerization, and thus it is commercially used.

Representative examples of the catalyst as used in such ring opening polymerization include a Sn-containing catalysts such as $Sn(Oct)_2$ (Oct=2-ethyl hexanoate). However, this catalyst not only promotes the ring opening polymerization, but also tends to accelerate the depolymerization at a conversion rate exceeding a certain level (see U.S. Pat. No. 5,142,023; Leenslag et al. Makromol. Chem. 1987, 188, 1809-1814; Witzke et al. Macromolecules 1997, 30, 7075-7085). Accordingly, the polylactide resin prepared from the ring opening polymerization tends to have a decreased molecular weight, a broadened molecular weight distribution, and an increased amount of remaining monomers, all of which can have an undesirable effect on the polymer properties. Also, the ring opening polymerization using such catalyst can achieve only a limited level of conversion rate.

In other words, the ring opening polymerization of the lactide as described above is a reaction involving a thermodynamic equilibrium between the monomers and the polymer, wherein the conversion rate to the polylactide resin increases at the beginning as the polymerization time passes, but the reaction reaches some degree of equilibrium when the conversion rate no longer increases. This also means that the resulting polylactide resin after the polymerization essentially contains a certain amount of the monomer therein. Generally, it has been known that as the reaction temperature becomes higher, the amount of the monomer at the equilibrium state increases, while the reverse holds true as the reaction temperature is reduced. Not only do the monomers remaining in the polylactide resin after the polymerization have detrimental effects on the mechanical properties of the resin, but they also tend to be hydrated, causing corrosion at the time of processing, and can accelerate the decomposition via the depolymerization of the resin. Accordingly, controlling the amount of the monomer remaining after the polymerization is very critical.

Due to the foregoing drawbacks, even when using the ring opening polymerization previously known in the art, it is difficult to obtain a polylactide resin with a sufficiently high molecular weight and excellent mechanical properties at a high conversion rate because of the depolymerization. Moreover, in their use, the polylactide resins suffered the decomposition caused by the monomers and the catalyst remaining therein, which in turn brought about serious problems in their properties, such as hydrolysis resistance, heat resistance, and the like. Such problems have hindered efforts to apply the polylactide resins for a semi-permanent use, such as for exterior materials of the cell phones and interior materials of vehicles.

Meanwhile, attempts have been made to suppress the depolymerization or the decomposition of the polylactide resin and to obtain polylactide resins having a higher molecular weight and excellent mechanical properties at a high conversion rate.

First, there was an attempt to carry out ring opening polymerization using a Sn-containing catalyst, wherein an amine-based proton trapping agent was added in order to prevent the depolymerization. However, even with this measure, which could prevent the acid from lowering the catalytic activity or causing a hydrolysis of the resin to some extent, it was found that the depolymerization still proceeded and it was difficult to obtain polylactide resins having a high molecular weight and excellent mechanical properties. (Majerska et al. Macromol Rapid Commun 2000, 21, 1327-1332; Kowalski et al. Macromolecules 2005, 38, 8170-8176)

In addition, some recent reports revealed that the polymerization activity and the molecular weight increase when the lactides are polymerized by using a $Sn(Oct)_2 \cdot P(Ph)_3$ compound coordinated by a phosphine compound. Expectedly, this was due to the fact that electrons in the Sn-containing catalyst were localized by the phosphine and thereafter the coordination of the lactide monomers was induced faster (see U.S. Pat. No. 6,166,169; Degee et al. Journal Polymer Science Part A; Polymer chemistry 1999, 37, 2413-2420; Degee et al Macromol. Symp. 1999, 144, 289-302). Also, U.S. Pat. No. 5,338,822 discloses a method of preventing the depolymerization wherein the resin melt obtained from the lactide polymerization was subjected to a post-treatment by adding a phosphite-based antioxidant thereto.

However, even with those methods, it was difficult to obtain a polylactide resin with a high molecular weight and excellent mechanical properties at a high conversion rate, and it was difficult to sufficiently prevent the depolymerization or the decomposition of the resin during its use caused by the catalyst or the monomer. Therefore, the polylactide resins have failed to have a satisfactory level of hydrolysis resistance or heat resistance.

SUMMARY OF THE INVENTION

Thus, the present invention is to provide an organometallic complex and a catalyst composition that can be preferably used as a catalyst in a ring opening polymerization of lactide monomers to produce a polylactide resin with enhanced properties such as mechanical properties, heat resistance, and hydrolysis resistance at a high conversion rate.

Further, the present invention is to provide a process for preparing the organometallic complex.

Further, the present invention is to provide a polylactide resin with a higher molecular weight and excellent mechanical properties, wherein the depolymerization or the decomposition in its use is also suppressed so that the resin shows better hydrolysis resistance and heat resistance.

The present invention is to further provide a process for preparing a polylactide resin, which uses the organometallic complex or the catalyst composition and makes it possible to produce the polylactide resin at a high conversion rate.

Moreover, the present invention is to provide a polylactide resin composition including the polylactide.

DETAILED DESCRIPTION OF THE EMBODIMENT

According to specific embodiments of the present invention, organometallic complexes and catalyst compositions, a method of producing the organometallic complexes, and polylactide resins and a process for preparing the same will be explained hereinafter.

Unless otherwise stated explicitly, several terms as used herein are defined as follows.

Unless particularly mentioned herein, the term "including" or "containing" refers to including some element (or component) without any limitation, and should not be construed as excluding addition of other elements (or components).

Also, in the entire specification, the term "lactide monomer" can be defined as follows. Typically, lactides can be classified into L-lactide consisting of L-lactic acid, D-lactide consisting of D-lactic acid, and meso-lactide consisting of an L-type and a D-type. Also, a mixture of L-lactide and D-lactide (50:50) is referred to as D,L-lactide or rac-lactide. Among these lactides, the polymerization proceeding only with either of L-lactide and D-lactide that have a high level of optical purity is known to yield an L- or D-polylactide (PLLA or PDLA) with a high level of stereoregularity. Such polylactides have a faster crystallization rate and a higher crystallization degree than a polylactide having a low level of optical purity. However, the term "lactide monomer" is defined to include all types of lactides regardless of the characteristic differences of lactides depending on their types and the characteristic differences of the polylactides as obtained therefrom.

In the entire specification, the term "polylactide resin" is defined to comprehensively refer to a homopolymer or copolymer including a repeating unit represented by the following General Formula. Such "polylactide resin" can be prepared by a process including a step of forming the following repeating unit by the ring opening polymerization of the "lactide monomer" as described above. The polymer obtained after the completion of such ring opening polymerization and the formation of the following repeating unit can be referred to as the "polylactide resin." As stated above, the category of the "lactide monomer" includes any types of lactides.

[General Formula]

In the category of the polymer that can be referred to as the "polylactide resin", all the polymers are included in any state after the completion of the ring opening polymerization and the formation of the repeating unit, for example, unpurified or purified polymers after the completion of the ring opening polymerization, the polymers contained in the liquid or solid resin composition prior to being molded into an article, or the polymers contained in plastics or woven materials after being molded into an article. Accordingly, in the entire specification, properties of the "polylactide resin" (such as acidity, weight average molecular weight, amount of the catalyst residue, or the like) can be defined by the properties of the polymer in any state after the completion of the ring opening polymerization and the formation of the repeating unit.

Also, in the entire specification, the term "polylactide resin composition" is defined to refer to any composition prior to or after a molding into an article, including one including the "polylactide resin" or one prepared therefrom. In the category of the composition that can be referred to as such "polylactide resin composition" not only a liquid or solid resin composition in the form of a master batch or a pellet before a molding into an article is included, but also plastics or woven materials after a molding into an article.

The present inventors found the following to complete the present invention: when a novel organometallic complex having a carbodiimide structure bonded with a specific substituent group, or a catalyst composition including a compound of the carbodiimide structure and a metal compound, is used as a catalyst in the ring opening polymerization of lactide monomers, it is possible to produce a polylactide resin at a high conversion rate, the polylactide resin having a molecular weight higher than any previously known polylactides and thereby having excellent mechanical properties and having improved hydrolysis resistance and improved heat resistance since the decomposition in use can be suppressed.

Thus, an organometallic complex of Chemical Formula 1 is provided according to an embodiment of the present invention.

[Chemical Formula 1]

In the above formula, n is an integer of 0 to 15, p is an integer of 0 to 2, a is 0 or 1, M is Sn or Zn, $R^1$ and $R^3$ are the same as or different from each other, and each of them is hydrogen, a substituted or unsubstituted C3 to C10 alkyl, a substituted or unsubstituted C3 to C10 cycloalkyl, or a substituted or unsubstituted C6 to C10 aryl, $R^2$ is a substituted or unsubstituted C3 to C10 alkylene, a substituted or unsubstituted C3 to C10 cycloalkylene, or a substituted or unsubstituted C6 to C10 arylene, and each of X and Y is independently an alkoxy group or a carboxyl group.

Further, a catalyst composition including a compound of Chemical Formula 2 and a compound of Chemical Formula 3 is provided according to other embodiments of the present invention:

[Chemical Formula 2]

[Chemical Formula 3]

$MX_pY_{2-p}$

In the above formulae, n is an integer of 0 to 15, p is an integer of 0 to 2, M is Sn or Zn, $R^1$ and $R^3$ are the same as or different from each other, and each of them is hydrogen, a substituted or unsubstituted C3 to C10 alkyl, a substituted or unsubstituted C3 to C10 cycloalkyl, or a substituted or unsubstituted C6 to C10 aryl, $R^2$ is a substituted or unsubstituted C3 to C10 alkylene, a substituted or unsubstituted C3 to C10 cycloalkylene, or a substituted or unsubstituted C6 to C10 arylene, and each of X and Y is independently an alkoxy group or a carboxyl group.

As substantiated by the following examples, an organometallic complex of Chemical Formula 1 or a catalyst composition including the compounds of Chemical Formula 2 and Chemical Formula 3 can show an excellent level of polymerization activity when being used as a catalyst in the ring opening polymerization of the lactide monomer. Therefore, it has been found that a polylactide resin having a high molecular weight can be obtained through the ring opening polymerization even with using a reduced amount of the catalyst.

Meanwhile, it was known that in the ring opening polymerization of the lactide monomers, the catalyst reacts with an initiator having a hydroxy group or moisture to form a metal hydroxy compound or an alkoxide compound, which is actually used as catalytically active species. In other words, the ring opening polymerization is promoted by the metal hydroxy compound or the alkoxide compound to produce a polylactide resin. In the process of forming the metal hydroxy compound or the alkoxide compound, some compounds having a carboxylic acid group or a hydroxy group are left behind, involving the depolymerization or the decomposition of the polylactide resin (see Kowalski et al. Macromolecules 2000, 33, 7359-7370).

More specifically, the depolymerization or the decomposition that occurs as an equilibrium reaction for the polymerization of the polylactide resin is triggered by a hydrolysis reaction caused either by the carboxylic acid or by the moisture and lactic acid contained in the lactide monomer, a back-biting reaction caused by the catalyst bonded to the end of the polymer chain, or a transesterification reaction between the polymer chains with the catalyst bonded at their end and the carboxylic acid.

In this regard, it is expected that the specific carbodiimide component contained in the organometallic complex of Chemical Formula 1 or the catalyst composition can be coupled with the moisture or the carboxylic acid so as to eliminate the same. Therefore, when the ring opening polymerization of the lactide monomer proceeds when using the organometallic complex or the catalyst composition in accordance with the embodiment of the present invention, the hydrolysis reaction or the transesterification reaction by the moisture or the carboxylic acid can be suppressed so that the depolymerization or the decomposition of the polylactide resin can be greatly reduced.

Accordingly, when being used as a catalyst for carrying out the ring opening polymerization of the lactide monomer, the organometallic complex or the catalyst composition according to the embodiment of the present invention shows excellent polymerization activity and inhibition effect against the depolymerization caused by the catalyst, making it possible to produce high-molecular weight polylactide resins at a high conversion rate.

As substantiated by the following examples, the organometallic complex or the catalyst composition also acts to remove moisture or acids, and thus when being used to carry out the ring opening polymerization of the lactide monomer, it can produce a polylactide resin having a lower level of acidity and thereby the decomposition of the polylactide resin after the polymerization or during its use can also be greatly suppressed.

In addition, because the organometallic complex and the catalyst composition show excellent activity as a catalyst for the ring opening polymerization, using them even in a relatively small amount makes it possible to produce high-molecular weight polylactide resins while curbing the amount of catalyst residue to a low level.

Therefore, when using the organometallic complex and the catalyst composition, one can produce a polylactide resin at a high conversion rate, the polylactide resin having excellent properties suitable for a semi-permanent use, such as superior mechanical properties resulting from the high molecular weight, and excellent hydrolysis resistance or heat resistance resulting from lower acidity or a smaller amount of the catalyst residue.

Meanwhile, the organometallic complex of Chemical Formula 1 or the compound of Chemical Formula 2 contained in the catalyst composition has a specific carbodiimide structure substituted with a C3 to C10 alkyl group, cycloalkyl group, alkylene group, or cycloalkylene group, or a C6 to C10 aryl group or arylene group at the position of $R^1$ to $R^3$. As substantiated by the following examples and comparative examples, such specific carbodiimide structure of the compound of Chemical Formula 1 or Chemical Formula 2 allows the organometallic complex and the catalyst composition to show excellent polymerization activity while effectively removing the moisture or the acids contained in the resin, and thereby the polylactide resin with excellent properties can be produced at a high conversion rate.

More specifically, as the organometallic complex of Chemical Formula 1 or the compound of Chemical Formula 2, one can use a compound wherein $R^1$ and $R^3$ are monovalent phenyl groups substituted with a C1 to C10 alkyl group, or a C3 to C10 alkyl group or cycloalkyl group, and $R^2$ is a divalent phenylene group substituted with a C1 to C10 alkyl group or a C3 to C10 alkylene group or cycloalkylene group.

Also, the $MX_pY_{2-p}$ attached to Chemical Formula 1, or the compound of Chemical Formula 3, can be a compound containing Sn or Zn, or any mixture of at least two of the foregoing compounds, and representative examples of such compound include tin(II) 2-ethylhexanoate ($Sn(Oct)_2$).

The organometallic complex of Chemical Formula 1 can be prepared by a process including a step of a reaction of the compounds of Chemical Formula 2 and Chemical Formula 3, as substantiated by the following examples.

Further, a polylactide resin having acidity of 10 meq/kg or less and a weight average molecular weight of 100,000 to 1,000,000 is provided according to other embodiments of the present invention.

Such polylactide resin can have a weight average molecular weight higher than any other polylactide resins previously known in the art. Such a high weight average molecular weight is due to the fact that the catalyst such as the organometallic complex has excellent polymerization activity and plays a role of suppressing the depolymerization. No polylactide resin with a weight average molecular weight of as high as 1,000,000 has been disclosed or provided yet. Thanks to such a high weight average molecular weight, the polylactide resin according to the embodiment of the present invention possesses excellent mechanical properties such as tensile strength in comparison with the previously known polylactide resin, allowing semi-permanent use of the polylactide resin.

In addition, thanks to the excellent activity of the catalyst such as the organometallic complex, the polylactide resin can be prepared in the presence of a smaller amount of the catalyst to have a higher molecular weight, and it can also have its depolymerization or decomposition during or after the polymerization being suppressed. Accordingly, in the polylactide resin, the amount of the monomer and the catalyst remaining after the polymerization can be minimized so that the polymer can have even better mechanical properties and the decomposition in use caused by the monomer residue or the like can be suppressed and thereby the polymer shows superior hydrolysis resistance.

The acidity of the polylactide resin according to the embodiment of the present invention is lower than that of any other polylactide resins previously known in the art. As a result, during the use of the polylactide resins or the articles prepared therefrom, the decomposition of the polylactide resin or the decrease in its molecular weight can be suppressed so that the hydrolysis resistance or the heat resistance of the polylactide resin can be further enhanced. Moreover, the polylactide resins can maintain their mechanical or physical properties (e.g., tensile strength) at an excellent level.

In this regard, non-limiting principles and causes will be explained as follows.

During the preparation process of the polylactide resin, one can use, for example, a Sn-containing catalyst for the ring opening polymerization, some of which will inevitably remain in the resulting resin as prepared. Such remaining catalyst can be coupled to the end of the polylactide resin and the resulting coupled product causes a transesterification reaction with a carboxylic acid, possibly leading to the decomposition of the polylactide resin or a decrease in the molecular weight thereof.

However, the polylactide resin according to the embodiment of the present invention shows lower acidity (e.g., a low content of carboxylic acid) and includes a reduced amount of the catalyst residue as mentioned above so that the decomposition of the polylactide resin or the decrease in the molecular weight thereof that is caused by the transesterification reaction can be suppressed, making it possible to achieve excellent decomposition resistance (hydrolysis resistance) or heat resistance. In addition, because the decrease in the molecular weight of the polylactide resin is suppressed and the occurrence of the monomers resulting from the decomposition of the resin is prevented, the mechanical and physical properties of the polylactide resin can be maintained at an excellent level.

The results of the experiments conducted by the present inventor have demonstrated that a polylactide resin with low acidity of 10 meq/kg or less exhibits a particularly excellent hydrolysis resistance and thus almost no decrease in the molecular weight is observed, and thereby it is possible to maintain physical or mechanical properties such as tensile strength at an excellent level.

Therefore, while demonstrating and maintaining excellent physical and mechanical properties, the polylactide resin according to the embodiment of the present invention shows enhanced hydrolysis resistance and heat resistance, allowing its semi-permanent use for the exterior materials of cell phones or interior materials of vehicles.

Further, the polylactide resin according to the embodiment of the present invention as described above can have acidity of 3 to 10 meq/kg or less and a weight average molecular weight of 200,000 to 1,000,000. Accordingly, the polylactide resin shows superior hydrolysis resistance and heat resistance in combination with further enhanced mechanical properties suitable for a semi-permanent use and can be prepared at an outstanding conversion rate by using the specific catalysts and the preparation process, which will be described hereinbelow.

In addition, the amount of the residue catalyst in the polylactide resin can be 15 ppm or less, preferably 10 ppm or less, and more preferably 7 ppm or less (e.g., 3-7 ppm). Also, as described above, the polylactide resin according to an embodiment of the present invention can be obtained by using the novel catalyst with excellent polymerization activity, and the residual catalyst may include such novel catalyst, i.e., the organometallic complex of Chemical Formula 1 or a mixture of the compounds of Chemical Formula 2 and Chemical Formula 3.

Because the novel catalyst shows excellent polymerization activity, the polylactide resin can be obtained in the presence of a smaller amount of the catalyst to have a high molecular weight, and as a result of this, it can have a smaller amount of the catalyst residue such as 15 ppm or less, preferably 10 ppm or less, and more preferably 7 ppm or less. The catalyst residue is present at such a small amount that the bonding of the catalyst residue to the end of the polylactide resin and its triggering of a back-biting reaction or a transesterification reaction can be suppressed, and thereby the decomposition of the polylactide resin or the decrease in the molecular weight thereof can be reduced. Therefore, the polylactide resin with the decreased amount of catalyst residue can maintain its mechanical properties at an excellent level, showing superior hydrolysis resistance and heat resistance.

Also, as will be described in detail below, the novel catalyst, in particular the carbodiimide component corresponding to Chemical Formula 2, can be coupled with moisture or an acid to remove it and thereby curb the hydrolysis of the polylactide resin caused by moisture, the transesterification caused by acid (e.g., carboxylic acid), and other decomposition/depolymerization results of the polylactide resin. Because the polylactide resin includes such carbodiimide component in the catalyst residue, the decomposition or the decrease in the molecular weight can be further suppressed, and thereby the resin shows more enhanced mechanical properties, hydrolysis resistance, and the like.

Moreover, the polylactide resin according to the embodiment of the present invention can show a weight loss of less than 20 wt % when being heated from room temperature to 300° C. during thermal gravimetric analysis (TGA). As corroborated by the following examples and FIG. 4, when being heated up to 300° C., conventional polylactide resins undergo thermal degradation to have a weight loss exceeding 30 wt %. In contrast, the polylactide resin according to the present invention has a weight loss of less than 20 wt %, showing excellent hydrolysis resistance and heat resistance. Therefore, the polylactide resin can be utilized very appropriately in a semi-permanent use.

In accordance with another embodiment of the present invention, a process for preparing a polylactide resin by using the organometallic complex or the catalyst composition as described above is provided. According to an embodiment of the present invention, the preparation process can include carrying out ring opening polymerization with lactide monomers in the presence of an organometallic complex of Chemical Formula 1. According to another embodiment of the present invention, the preparation process can include carrying out ring opening polymerization with lactide monomers in the presence of compounds of Chemical Formula 2 and Chemical Formula 3.

In the preparation method of the polylactide resin, using the organometallic complex or the catalyst composition as described above to carry out the ring opening polymerization of the lactide monomers makes it possible to produce a polylactide resin having a higher molecular weight and thus excellent mechanical properties at a high conversion rate.

Moreover, the specific carbodiimide structure contained in the organometallic complex or the like may act to remove moisture or acids so as to prepare a polylactide resin having lower acidity. Further, the excellent activity of the organometallic complex may reduce the amount of catalyst residue present in the polylactide resin.

As a result, triggering of a transesterification reaction between the catalyst residue and the acid component such as carboxylic acids or a back-biting reaction by the catalyst residue can be suppressed, and the depolymerization or the decomposition occurring during the polymerization or the use of the resin can be greatly reduced. Thus, the preparation process of the polylactide resin can produce a polylactide resin having more enhanced hydrolysis resistance.

Therefore, according to the preparation process of the polylactide resin as described above, one can obtain a polylactide resin with excellent properties such as mechanical properties or hydrolysis resistance at a high conversion rate.

Meanwhile, in the preparation process of the polylactide resin as described above, the lactide monomers can be prepared from lactic acid by typical methods. Also, the lactide monomers can be any types of lactides, for example, all sorts of lactides including L,L-lactide, D,L-lactide, and D,D-lactide.

In the above preparation process, the compounds of Chemical Formula 1 or Chemical Formula 2 can have a specific carbodiimide structure substituted with either a C3 to C10 alkyl group, cycloalkyl group, alkylene group, or cycloalkylene group, or a C6 to C10 aryl group or arylene group. As substantiated by the following examples and comparative examples, thanks to having such specific carbodiimide structure, the above compound has excellent polymerization activity and at the same time can eliminate the moisture or the acid contained in the resin, making it possible to produce a polylactide resin with a higher molecular weight and lower acidity. More specifically, one can use a compound of Chemical Formula 1 or Chemical Formula 2, wherein $R^1$ is a monovalent phenyl group substituted with a C1 to C10 alkyl group, or a C3 to C10 alkyl group or cycloalkyl group, and $R^2$ is a divalent phenylene group substituted with a C1 to C10 alkyl group, or a C3 to C10 alkylene group or cycloalkylene group.

Also, the $MX_pY_{2-p}$ attached to Chemical Formula 1, or the compound of Chemical Formula 3, can be a Sn- or Zn-containing compound or a mixture of at least two of the foregoing compounds. Representative examples of such compound include tin(II) 2-ethylhexanoate ($Sn(Oct)_2$).

Further, the organometallic complex of Chemical Formula 1 can be prepared by a process including a step of subjecting the compounds of Chemical Formula 2 and Chemical Formula 3 to a reaction, which will be substantiated by the following examples.

Also, in the preparation process of the polylactide resin, the organometallic complex of Chemical Formula 1 or the compounds of Chemical Formulae 2 and 3 contained in the catalyst composition can be added at a ratio of 0.001 to 0.1 mole with respect to 100 moles of the lactide monomers, respectively, to conduct the ring opening polymerization. If the addition ratio of the catalyst becomes extremely low, the polymerization activity would be undesirably insufficient. On the other hand, if the addition ratio of the catalyst becomes exceedingly high, the amount of the catalyst residue in the polylactide resin as produced would increase so much so as to bring about the decomposition or the decrease in the molecular weight of the polylactide due to the depolymerization such as a transesterification reaction.

In the preparation process of the polylactide resin, one can use either the organometallic complex of Chemical Formula 1 as a single catalyst or the catalyst composition including the compounds of Chemical Formula 2 and Chemical Formula 3 as a catalyst. In terms of a high molecular weight of the resin as obtained from the polymerization or the polymerization activity or the conversion rate to the resin, it is more preferable to use the organometallic complex as a single catalyst.

Moreover, when the catalyst composition including the compounds of Chemical Formula 2 and Chemical Formula 3 is used, the compounds of Chemical Formula 2 and Chemical Formula 3 can be added either simultaneously or sequentially with an interval therebetween. Further, they can be added either before the addition of the lactide monomer or prior to the initiation of the polymerization within a certain time, or directly before the initiation of the polymerization. However, in order to allow the compounds of Chemical Formula 2 and Chemical Formula 3 to react to some extent and form a complex therebetween, it is preferable for the compounds of Chemical Formulae 2 and 3 to be simultaneously added at a predetermined time before the initiation of the polymerization and then to add the monomer to initiate the polymerization.

Also, in the preparation process of the polylactide resin, the ring opening polymerization can be carried out in the presence of an initiator including a compound with a hydroxyl group. The initiator can play a role of reacting with a catalyst such as the organometallic complex or the catalyst composition to form an effective catalytic species and initiate the ring opening polymerization. Accordingly, using the initiator in combination with the catalyst can cause further improvement in the catalyst activity, thereby producing the polylactide resin at a higher conversion rate. Additionally, the initiator can take part in some of the depolymerization or the decomposition of the resin to play a role of controlling the molecular weight of the polylactide resin.

As the initiator, one can use any compound having a hydroxy group, with no limitation. However, a compound having less than 8 carbon atoms can be vaporized at the temperature of the ring opening polymerization due to its low molecular weight, and this can hinder its involvement in the polymerization reaction. Therefore, a compound with a hydroxy group that can be preferably used as the initiator has at least 8 carbon atoms, preferably 8 to 15 carbon atoms, and more preferably 8 to 12 carbon atoms.

Moreover, in order for the ring opening polymerization to be carried out, the initiator can be added at a ratio of 0.001 to 1 mole with respect to 100 moles of the lactide monomers. If the addition ratio of the initiator becomes extremely low, the molecular weight of the resin as obtained by the ring opening polymerization would be so high that subsequent processing can become difficult. If the addition ratio of the initiator becomes too high, the molecular weight of the resin can decrease.

Also, it is preferable for the ring opening polymerization of the lactide monomer to be carried out as bulk polymerization substantially without using any solvent. In this regard, "without using any solvent" includes using a small amount of a solvent for dissolving the catalyst, for example less than at most 1 mL of a solvent per kilogram of the lactide monomer.

Conducting the ring opening polymerization in the form of bulk polymerization can eliminate a process for removing the solvent after the polymerization and avoid decomposition or loss of the resin in such a solvent elimination process. Further, the bulk polymerization makes it possible to obtain the polylactide resin at a high conversion rate and at a high yield.

Moreover, the ring opening polymerization of the lactide monomers can be performed at a temperature of 120 to 200° C. for 0.5 to 8 hours, preferably 0.5 to 4 hours. In the above preparation process, because the catalyst with superior activity is used, the ring opening polymerization carried out even for a shorter period than known before can provide a polylactide resin with a high molecular weight at a high conversion rate. Also, because the polymerization proceeds for a short period of time, the depolymerization or the decomposition of the resin can be preferably reduced.

According to the preparation process as described above, it is possible to produce the polylactide resin having a high molecular weight and lower acidity and thus showing excellent mechanical properties, hydrolysis resistance, and heat resistance at a high conversion rate.

In accordance with another embodiment of the present invention, a polylactide resin composition including the polylactide resin described above is provided.

The polylactide resin composition includes the polylactide resin with excellent mechanical properties, hydrolysis resistance, and heat resistance, and thus demonstrates excellent physical and mechanical properties so that it can be preferably utilized in a semi-permanent use such as for packaging for electronics or interior materials for vehicles.

The polylactide resin composition can include the polylactide resin either alone or in combination with a polycarbonate resin, an ABS resin, or a polypropylene resin. However, in order to exhibit unique properties of the polylactide, the resin composition can include the polylactide resin in an amount of 40 wt % or more, preferably 60 wt % or more, and more preferably 80 wt % or more, based on the content of the total resins contained therein.

Also, the polylactide resin composition can include various additives that have been contained in a range of conventional resin compositions.

The polylactide resin compositions can be produced either as liquid or solid resin compositions prior to molding into the end-product or as plastics or woven materials in their end-product state. The resulting plastics or woven materials can be prepared by typical processes depending on the type of each product.

As described above, an organometallic complex and a catalyst composition that can produce a polylactide resin with enhanced properties such as mechanical properties, heat resistance, and hydrolysis resistance at a high conversion rate, and a method of producing the organometallic complex, can be provided according to the present invention. Further, the present invention can provide a polylactide resin having a high molecular weight and superior mechanical properties and at the same time showing better hydrolysis resistance and heat resistance due to the inhibition of the depolymerization or the decomposition in use, a process for preparing the polylactide resin at a high conversion rate by using the organometallic complex or the catalyst composition, and a polylactide resin composition including the polylactide resin.

Therefore, for the polylactide resin that had previously found its use only as a disposable material, the present invention can make a great contribution to enabling it to be used not only for disposable products such as food wrapping films, household item films, and sheets, but also for various types of goods requiring a semi-permanent use such as packaging for electronics or interior materials for vehicles.

EXAMPLES

Hereinafter, actions and effects of the present invention will be explained in further detail with reference to the specific examples of the invention. However, it should be understood that these examples are merely illustrative of the present invention and the scope of the present invention is not to be determined by them.

Experimental Method

The following examples and comparative examples were conducted using standard Schlenk techniques or dry box techniques for all operations of handling compounds that are sensitive to air or water.

Nuclear magnetic resonance spectrums were obtained using a Bruker 600 Spectrometer, and ¹H-NMR was measured at 600 MHz.

The molecular weight of the polymer and the molecular weight distribution thereof were measured by gel permeation chromatography (GPC), using a polystyrene sample as a standard.

Synthesis Example 1

0.2 g (0.49 mmol) of Sn(Oct)$_2$ (Aldrich Co.) and 0.36 g (1.0 mmol) of the compound of Chemical Formula 4 (TCI Inc.) were put into a 100 mL flask, 30 mL of toluene was added thereto, and the mixture was stirred at 100° C. for 1 hour. Then, after the solvent was removed under vacuum, the resulting product was washed with a heptane solvent and dried to give 0.36 g of organometallic complex A.

[Chemical Formula 4]

Synthesis Example 2

0.2 g (0.49 mmol) of Sn(Oct)$_2$ (Aldrich Co.) and 0.36 g of the compound of Chemical Formula 5 (Rhein Chemie Inc.) were put into a 100 mL flask, and in the same manner as in Synthesis Example 1, 0.4 g of organometallic complex B was obtained.

Figure 1:
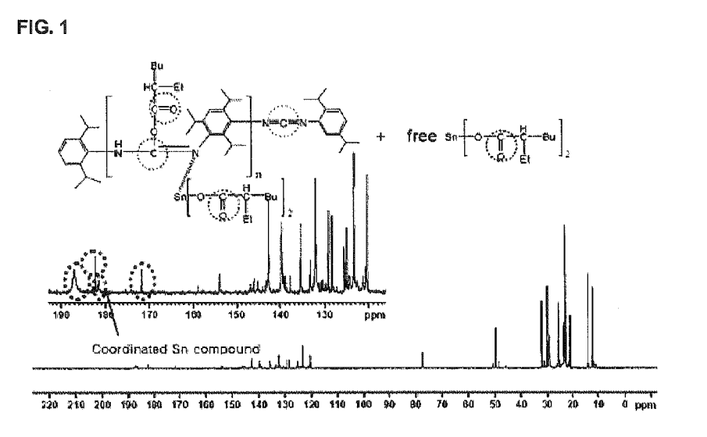
FIG. 1 shows a $^{13}C$ NMR spectrum for the organometallic complex of Synthesis Example 2.

FIG. 1 is ¹³C NMR spectrum of organometallic complex B. Referring to FIG. 1, in the reaction of the Sn(Oct)$_2$ catalyst and the compound of Chemical Formula 5, three peaks for a carbonyl group are shown at δ 188, 183, and 182 ppm, respectively. The peak at δ 183 ppm, which is very sharp, can be assigned to the one corresponding to the Oct-H acid compound coupled with the compound of Chemical Formula 5. The broad peak at δ 188 ppm corresponds to the one for free Sn(Oct)$_2$ and the broad peak at δ 182 ppm can be assigned to the one corresponding to the organometallic complex coordinated by the compound of Chemical Formula 5.

[Chemical Formula 5]

n = 10~12

Synthesis Example 3

0.2 g (0.49 mmol) of Sn(Oct)$_2$ (Aldrich Co.) and 0.12 g (1.0 mmol) of the compound of Chemical Formula 6 (TCI Inc.) were put into a 100 mL flask, 30 mL of toluene was added thereto, and the mixture was stirred at 100° C. for 1 hour. Then, after the solvent was removed under vacuum, the resulting product was washed with a heptane solvent and dried to give 2.5 g of organometallic complex C.

[Chemical Formula 6]

Synthesis Example 4

0.2 g (0.49 mmol) of Sn(Oct)$_2$ (Aldrich Co.) and 0.21 g (1.0 mmol) of the compound of Chemical Formula 7 (TCI Inc.) were put into a 100 mL flask, 30 mL of toluene was added thereto, and the mixture was stirred at 100° C. for 1 hour. Then, after the solvent was removed under vacuum, the resulting product was washed with a heptane solvent and dried to give 2.9 g of organometallic complex D.

[Chemical Formula 7]

Example 1

Preparation of the Polylactide Resin Using Organometallic Complex A (Lactide/Sn=1/20,000 (mol/mol), 140° C.)

After 2 g (13.8 mmol) of a lactide monomer and 0.2 mL of a toluene solution (conc. 3.5 mM) of organometallic complex A of Synthesis Example 1 were put into a 30 mL vial and left under vacuum for 12 hours, they reacted at a polymerization temperature of 140° C. for 4 hours. Then, the solidified polymers were dissolved in 30 mL of chloroform and precipitated in a methanol solvent. The resulting precipitate was filtered by a glass filter and the recovered polymer was dried in a vacuum oven at 50° C. for 24 hours to give 1.88 g of a polylactide resin (81 wt % based on the total amount of the monomer as introduced). The molecular weight (Mw) was 727,000, and Mw/Mn was 2.0.

Example 2

Preparation of the Polylactide Resin Using Organometallic Complex A (Lactide/Sn=1/20,000 (mol/mol), 160° C.)

After 2 g (13.8 mmol) of a lactide monomer and 0.2 mL of a toluene solution (conc. 3.5 mM) of organometallic complex A of Synthesis Example 1 were put into a 30 mL vial and left under vacuum for 12 hours, they reacted at a polymerization temperature of 160° C. for 1 hour. In the same manner as in Example 1, 1.84 g of a polylactide resin (92 wt % based on the total amount of the monomer as introduced) was obtained. The molecular weight (Mw) was 491,000, and Mw/Mn was 2.0.

Example 3

Preparation of the Polylactide Resin Using Organometallic Complex A (Lactide/Sn=1/60,000 (mol/mol), 180° C.)

After 2 g (13.8 mmol) of a lactide monomer and 0.07 mL of a toluene solution (conc. 3.5 mM) of organometallic complex A of Synthesis Example 1 were put into a 30 mL vial and left under vacuum for 12 hours, they reacted at a polymerization temperature of 180° C. for 1 hour. In the same manner as in Example 1, 1.34 g of a polylactide resin (81 wt % based on the total amount of the monomer as introduced) was obtained. The molecular weight (Mw) was 274,000, and the Mw/Mn was 1.7.

Example 4

Preparation of the Polylactide Resin Using Organometallic Complex B (Lactide/Sn=1/20,000 (mol/mol), 140° C.)

After 2 g (13.8 mmol) of a lactide monomer and 0.2 mL of a toluene solution (conc. 3.5 mM) of organometallic complex B of Synthesis Example 2 were put into a 30 mL vial and left under vacuum for 12 hours, they reacted at a polymerization temperature of 140° C. for 1 hours. Then, the solidified polymers were dissolved in 30 mL of chloroform and precipitated in a methanol solvent. The resulting precipitate was filtered by a glass filter and the recovered polymer was dried in a vacuum oven at 50° C. for 24 hours to give 1.67 g of a polylactide resin (81 wt % based on the total amount of the monomer as introduced). The molecular weight (Mw) was 711,000, and the Mw/Mn was 1.7.

Example 5

Preparation of the Polylactide Resin Using Organometallic Complex B (Lactide/Sn=1/20,000 (mol/mol), 160° C.)

After 2 g (13.8 mmol) of a lactide monomer and 0.2 mL of a toluene solution (conc. 3.5 mM) of organometallic complex B of Synthesis Example 2 were put into a 30 mL vial and left under vacuum for 12 hours, they reacted at a polymerization temperature of 160° C. for 1 hour. In the same manner as in Example 1, 1.72 g of a polylactide resin (81 wt % based on the total amount of the monomer as introduced) was obtained. The molecular weight (Mw) was 684,000, and the Mw/Mn was 1.8.

Example 6

Preparation of the Polylactide Resin Using Organometallic Complex B (Lactide/Sn=1/60,000 (mol/mol), 180° C.)

After 2 g (13.8 mmol) of a lactide monomer and 0.07 mL of a toluene solution (conc. 3.5 mM) of organometallic complex B of Synthesis Example 2 were put into a 30 mL vial and left under vacuum for 12 hours, they reacted at a polymerization temperature of 180° C. for 1 hour. In the same manner as in Example 1, 1.61 g of a polylactide resin (81 wt % based on the total amount of the monomer as introduced) was obtained. The molecular weight (Mw) was 276,000, and the Mw/Mn was 1.9.

Example 7

Preparation of the Polylactide Resin Using Organometallic Complex B (Lactide/Sn=1/80,000 (mol/mol), 180° C.)

After 2 g (13.8 mmol) of a lactide monomer and 0.05 mL of a toluene solution (conc. 3.5 mM) of organometallic complex B of Synthesis Example 2 were put into a 30 mL vial and left under vacuum for 12 hours, they reacted at a polymerization temperature of 180° C. for 4 hours. In the same manner as in Example 1, 1.8 g of a polylactide resin (88 wt % based on the total amount of the monomer as introduced) was obtained. The molecular weight (Mw) was 221,000, and the Mw/Mn was 1.8.

Example 8

Preparation of the Polylactide Resin Using Organometallic Complex C (Lactide/Sn=1/40,000 (mol/mol), 180° C.)

After 2 g (13.8 mmol) of a lactide monomer and 0.1 mL of a toluene solution (conc. 3.5 mM) of organometallic complex C of Synthesis Example 3 were put into a 30 mL vial and left under vacuum for 12 hours, they reacted at a polymerization temperature of 180° C. for 1 hour. In the same manner as in Example 1, 1.67 g of a polylactide resin (83 wt % based on the total amount of the monomer as introduced) was obtained. The molecular weight (Mw) was 214,000, and the Mw/Mn was 1.7.

Example 9

Preparation of the Polylactide Resin Using Organometallic Complex D (Lactide/Sn=1/40,000 (mol/mol), 180° C.)

After 2 g (13.8 mmol) of a lactide monomer and 0.1 mL of a toluene solution (conc. 3.5 mM) of organometallic complex D of Synthesis Example 4 were put into a 30 mL vial and left under vacuum for 12 hours, they reacted at a polymerization temperature of 180° C. for 1 hour. In the same manner as in Example 1, 1.78 g of a polylactide resin (89 wt % based on the total amount of the monomer as introduced) was obtained. The molecular weight (Mw) was 257,000, and the Mw/Mn was 1.9.

Example 10

Preparation of the Polylactide Resin in the Presence of the Compound of Chemical Formula 5 and Sn(Oct)$_2$ Catalyst (Lactide/Sn=1/60,000 (mol/mol), 180° C.)

After 2 g (13.8 mmol) of a lactide monomer, 0.1 wt % (based on the weight of the lactide) of the compound of Chemical Formula 5 (Rhein Chemie Inc.), and 0.07 mL of a toluene solution (conc. 3.5 mM) of Sn(Oct)$_2$ were put into a 30 mL vial and left under vacuum for 12 hours, they reacted at a polymerization temperature of 180° C. for 2 hours. In the same manner as in Example 1, 1.61 g of a polylactide resin (81 wt % based on the total amount of the monomer as introduced) was obtained. The molecular weight (Mw) was 337,000, and the Mw/Mn was 1.93.

Example 11

Preparation of the Polylactide Resin in the Presence of the Compound of Chemical Formula 5 and $Sn(Oct)_2$ Catalyst (Lactide/Sn=1/80,000 mol/mol 180° C.

After 2 g (13.8 mmol) of a lactide monomer, 0.1 wt % (based on the weight of the lactide) of the compound of Chemical Formula 5 (Rhein Chemie Inc.), and 0.05 mL of a toluene solution (conc. 3.5 mM) of $Sn(Oct)_2$ were put into a 30 mL vial and left under vacuum for 12 hours, they reacted at a polymerization temperature of 180° C. for 1 hour. In the same manner as in Example 1, 1.56 g of a polylactide resin (78 wt % based on the total amount of the monomer as introduced) was obtained. The molecular weight (Mw) was 231,000, and the Mw/Mn was 1.84.

Example 12

Controlling the Molecular Weight by an Initiator in the Preparation of the Polylactide Resin by Organometallic Complex B After 2 g (13.8 mmol) of a lactide monomer and 0.2 mL of a toluene solution (conc. 3.5 mM) of organometallic complex B were put into a 30 mL vial, and an initiator with a hydroxy group such as 2-ethylhexyl lactate, dodecyl alcohol, octanol, or ethylhexyl alcohol was added to each of the vials at a ratio of 1/1000, 2/1000, or 4/1000 (mol/mol) against the lactide monomer, respectively, they reacted at a polymerization temperature of 180° C. for 2 hours. Then, the reaction was carried out in the same manner as Example 1. Table 1 shows the amount of the initiator as added, the conversion rate to the polylactide resin, and the weight average molecular weight.

TABLE 1

|  | Alcohols (mol/mol) | 1/1000 | 2/1000 | 4/1000 |
|---|---|---|---|---|
| Conversion rate (%) | Ethyl hexyl lactate | 84.1 | 90.9 | 89.9 |
|  | Dodecyl alcohol | 89.1 | 88.2 | 87.9 |
|  | Ethyl hexyl alcohol | 86.1 | 85.6 | 83.6 |
|  | Octanol | 90.3 | 90.8 | 89.2 |
| Molecular weight (Mw * $10^{-3}$ Da) | Ethyl hexyl lactate | 318 | 286 | 147 |
|  | Dodecyl alcohol | 375 | 268 | 176 |
|  | Ethyl hexyl alcohol | 415 | 398 | 185 |
|  | Octanol | 356 | 295 | 148 |

Referring to Examples 1 to 12, it was found that when the polylactide resin was prepared by using either the organometallic complex of Examples 1 to 4 belonging to the category of Chemical Formula 1 or the mixture of the compounds belonging to the category of Chemical Formulae 2 and 3 (i.e., the catalyst composition) as a catalyst, it was possible to obtain a polylactide resin having a high weight average molecular weight of at least 100,000 in a relatively short period of time at a high conversion rate.

Also, referring to Example 12, it was found that when the initiator with a hydroxy group was added, the polylactide resin could be obtained at an even higher conversion rate. Further, as the initiator was added more or as the initiator with a hydroxy group had a longer chain, the molecular weight of the polylactide resin decreased, ascertaining that the initiator can play a role of controlling the molecular weight.

Experimental Example 1

Measurement of the Amount of the Catalyst Residue in Polylactide Resin

The amount of the catalyst residue in the polylactide resin was measured by inductively coupled plasma emission spectroscopy. With this method, the amounts of the catalyst residue in the polylactide resins prepared in Examples 7, 9, and 10 were measured, and the results are shown in Table 2.

TABLE 2

|  | Amount of Catalyst Residue (ppm) |
|---|---|
| Example 7 | 5 |
| Example 9 | 15 |
| Example 10 | 5 |

Referring to Table 2, it was found that the polylactide resin prepared by the examples had a small amount of the catalyst residue in the order of 5 to 15 ppm.

From the results, it is expected that, in the polylactide resins prepared by the examples, the depolymerization or the decomposition caused by the catalyst residue after the polymerization or in its use can be reduced by such a great extent that they have superior hydrolysis resistance or heat resistance.

Experimental Example 2

Preparation of Polylactide Resin

Figure 2:
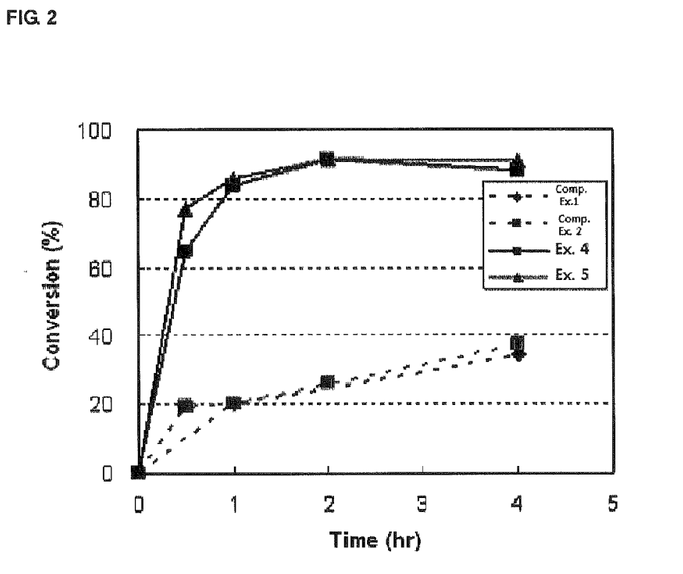
FIG. 2 shows curves plotting a change in the conversion rate to the polylactide resin as the ring opening polymerization time passes, in Examples 4 and 5 and Comparative Examples 1 and 2.
Figure 3:
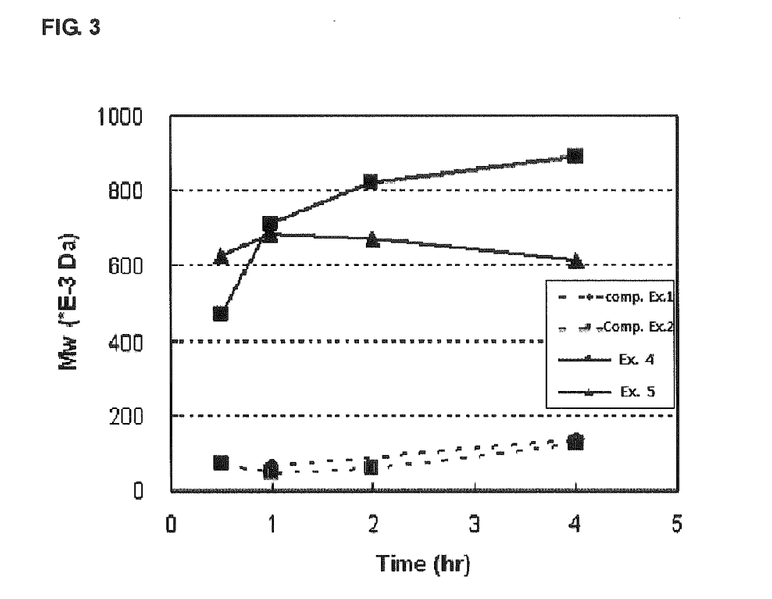
FIG. 3 shows curves plotting a change in the weight average molecular weight of the polylactide resin as the ring opening polymerization time passes, in Examples 4 and 5 and Comparative Examples 1 and 2.

With the same method as Example 1, except that $Sn(Oct)_2$ (Aldrich Co.) was used instead of the organometallic complex A, 2 g (13.8 mmol) of the lactide monomer and 0.28 mg of $Sn(Oct)_2$ (Aldrich Co.) (Sn/Mon=1/20,000 (mol/mol)) were put into 30 mL vials, respectively, and reacted at respective polymerization temperatures of 140° C. and 160° C. while changing the polymerization time (Comparative Example 1 and Comparative Example 2, respectively), and then the polymerization yield of the polylactide resin (the conversion rate to the polylactide resin) and the weight average molecular weight thereof were measured. The measurement results were compared with those of the polylactide resin obtained from Example 4 and Example 5 by carrying out the reaction in the same manner (i.e., at the same polymerization temperature and at the same mole ratio of Sn in the catalyst), the results of which are shown in Table 3. FIG. 2 and FIG. 3 show curves plotting the conversion rate and the molecular weight over the polymerization time, respectively.

TABLE 3

|  |  | Comp. Example 1 | Comp. Example 2 | Example 4 | Example 5 |
|---|---|---|---|---|---|
|  |  | Polymerization temperature (° C.) | | | |
|  | Time | 140 | 160 | 140 | 160 |
|  |  | Sn/monomer (mol/mol) | | | |
|  | (h) | 1/20,000 | 1/20,000 | 1/20,000 | 1/20,000 |
| Conversion rate (%) | 0.5 |  | 19.4 | 64.6 | 77.2 |
|  | 1 | 20.0 | 20.0 | 83.5 | 85.6 |
|  | 2 |  | 26.3 | 91.4 | 91.4 |
|  | 4 | 34.6 | 37.3 | 88.2 | 90.8 |
| Mw (*$10^{-3}$ Da) | 0.5 |  | 71.9 | 470.0 | 626.0 |
|  | 1 | 70.9 | 49.0 | 711.0 | 684.0 |

TABLE 3-continued

| | | Comp. Example 1 | Comp. Example 2 | Example 4 | Example 5 |
|---|---|---|---|---|---|
| | | Polymerization temperature (° C.) | | | |
| | Time | 140 | 160 | 140 | 160 |
| | | Sn/monomer (mol/mol) | | | |
| | (h) | 1/20,000 | 1/20,000 | 1/20,000 | 1/20,000 |
| Mw/Mn | 2 | | 61.0 | 821.0 | 670.0 |
| | 4 | 139.0 | 124.9 | 892.0 | 614.0 |
| | 0.5 | | 1.3 | 1.5 | 1.8 |
| | 1 | 1.2 | 1.5 | 1.7 | 1.8 |
| | 2 | | 1.3 | 2.0 | 2.0 |
| | 4 | 1.5 | 1.4 | 1.9 | 1.9 |

Referring to Table 3, FIG. 2, and FIG. 3, it was found that when the polylactide resin was prepared by using either the organometallic complex of Examples 1 to 4 belonging to the category of Chemical Formula 1 or the mixture of the compounds belonging to the category of Chemical Formulae 2 and 3 (i.e., the catalyst composition), the conversion rate to the polylactide resin increased to 80% or more from the beginning of the polymerization, and thereafter it showed a tendency of being gradually increased. Also, the molecular weight of the polylactide resin increased to around 400,000-600,000 in only the first 0.5 hour, and thereafter it showed a tendency of being gradually increased or almost maintaining its maximum value.

In contrast, it was found that when the conventional $Sn(Oct)_2$ catalyst was used according to the comparative examples, the conversion rate to polylactide resin was very low, i.e., 50% or less, and the molecular weight of the polylactide resin was also low, at most 150,000 or less.

These results show that the processes of the examples can produce the polylactide resin having a high molecular weight of 400,000 or more at a high conversion rate in a short period of time.

Comparative Example 3

With the same method as in Example 1, except that instead of organometallic complex A, $Sn(Oct)_2$ (Aldrich Co.) was used together with bis(trimethylsilyl)carbodiimide or an additive of phosphite or phenols (0.1 wt % based on the lactide monomer), 2 g (13.8 mmol) of the lactide monomer and 0.14 mg of $Sn(Oct)_2$ (Aldrich Co.) (Sn/Mon=1/40000 (mol/mol)) were put into 30 mL vials, respectively, and reacted at a polymerization temperature of 180° C. while changing the polymerization time, and then the polymerization yield (the conversion rate) and the weight average molecular weight were measured. A carbodiimide compound having a silicone atom, (i.e., bis(trimethylsilyl)carbodiimide) was used, TNPP and Irgafos 126 were used as a phosphite additive, and Irganox 1076 was used as a phenol additive. Data of the conversion rate and the weight average molecular weight as obtained from the polymerization are summarized in Table 4.

TABLE 4

| Additives | Polymerization hours (hr) | Conversion rate (%) | Mw ($*10^{-3}$ Da) | Mn ($*10^{-3}$ Da) | PDI |
|---|---|---|---|---|---|
| bis(trimethylsilyl) carbodiimide | 1 | 17.5 | 23.1 | 19.3 | 1.2 |
| | 2 | 25.6 | 35.2 | 25.1 | 1.4 |
| | 4 | 48.9 | 5.86 | 41.8 | 1.4 |
| TNPP | 1 | 23.6 | 51.7 | 38.8 | 1.3 |
| | 2 | 24.5 | 33.7 | 27.0 | 1.2 |
| | 4 | 45.7 | 86.7 | 57.9 | 1.5 |
| IRF126 | 1 | 14.6 | 19.0 | 17.9 | 1.1 |
| | 2 | 32.4 | 57.6 | 47.0 | 1.2 |
| | 4 | 50.1 | 49.8 | 34.5 | 1.4 |
| IRN1076 | 1 | 25.6 | 43.5 | 35.6 | 1.2 |
| | 2 | 41.6 | 52.2 | 40.2 | 1.3 |
| | 4 | 57.7 | 75.1 | 49.3 | 1.5 |

Referring to Table 4, it was found that when other carbodiimide compounds were used instead of a compound having a specific carbodiimide structure substituted with an alkyl group, cycloalkyl group, or aryl group (e.g., the compound of Chemical Formula 2 or the organometallic complex of Chemical Formula 1), not only did they have lower polymerization activity, which was translated into a lower conversion rate to polylactide resin, but they also could only produce the polylactide resin having a low weight average molecular weight. Also, it was found that even when using the additive of phosphite or phenol as disclosed in U.S. Pat. No. 5,338,822, the polylactide resin as obtained had a weight average molecular weight of only about 90,000 or less, ascertaining that such additives had limitations in obtaining a high molecular weight polylactide resin.

Experimental Example 3

Acidities were measured for the polylactide resins as obtained by the polymerization for 4 hours in Comparative Examples 1 and 2 and the polylactide resins obtained in Examples 3 and 7. The measurement of the acidity was conducted with Metrohm 809 Titando equipment using a 0.1N KOH ethanol solution as a titration solution. The results are shown in Table 5.

Referring to Table 5, it was found that the polylactide resins of the examples have low acidity of 5 meq/kg or less, while the ones from the comparative examples have high acidity of 35 meq/kg or more. These results ascertain that the preparation process of the examples can produce the polylactide resin having a high molecular weight and a low acidity. Also, because the polylactide resins of the examples have low acidity, it is expected that the transesterification reaction or the hydrolysis between the resins with the catalyst coupled at their end and the moisture or the acid can be suppressed so that the decomposition of the polylactide resin or the decrease in its molecular weight can be greatly reduced. Therefore, expectedly, the polylactide resins of the examples can maintain their superior mechanical properties resulting from the high molecular weight, while showing better decomposition resistance.

TABLE 5

| | Acidity (meq/Kg) |
|---|---|
| Example 3 | 3 |
| Example 7 | 4 |
| Comparative Example 1 | 35 |
| Comparative Example 2 | 41 |

Experimental Example 4

Figure 4:
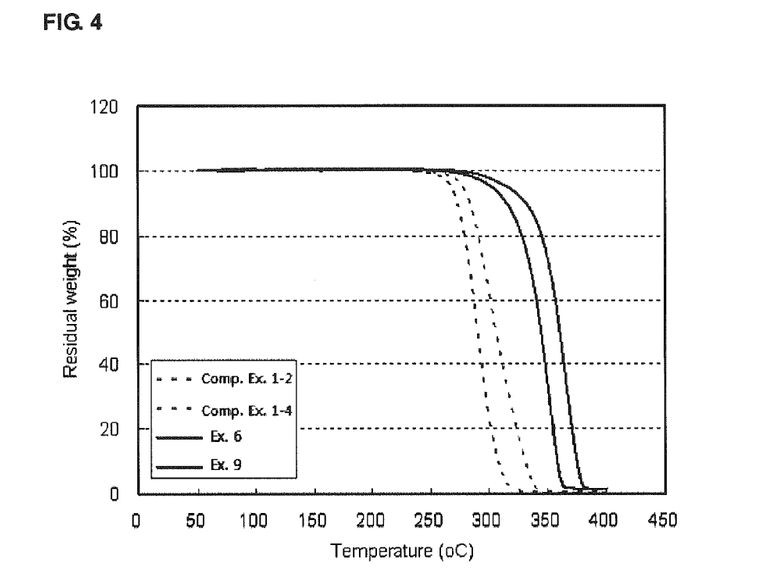
FIG. 4 shows curves illustrating the results of thermal gravimetric analysis (TGA) for the polylactide resin as prepared in Examples 6 and 9 and Comparative Example 1.

Thermal gravimetric analysis was carried out in order to test heat stability for the polylactide resins obtained by 2 hour and a 4 hour polymerizations in Comparative Example 1, respectively, and the polylactide resins obtained from Examples 6 and 11. The results are shown in FIG. 4. In FIG. 4, the "Comp. Ex. 1-2" shows an analysis result for the polylactide resin obtained by 2 hour polymerization in Comparative Example 1 while "Comp. Ex. 1-4" shows an analysis result for the polylactide resin obtained by 4 hour polymerization in Comparative Example 1. Also, the thermal gravimetric analysis was conducted with heating from room temperature to 400° C. at a heating rate of 10° C./min, and Mettler-Toledo TGA 851 e equipment was used as TGA equipment.

Referring to FIG. 4, it was found that the decomposition was minimized in the polylactide resins of the examples even when heating to about 300° C., and the resins showed a weight loss of less than 20 wt %. In contrast, the polylactide resins of the comparative examples showed a weight loss exceeding at least 30 wt % when heating to about 300° C.

Therefore, it was found that the polylactide resin of the examples has hydrolysis resistance and heat resistance better than the one of the comparative examples and thereby can maintain excellent mechanical properties.

Experimental Example 6

Measurement of Hydrolysis Resistance

With the same method as Comparative Example 1, except for changing the amount of the catalyst to Sn(Oct)$_2$ (Aldrich Co.) and the polymerization temperature, 2 g (13.8 mmol) of a lactide monomer and 0.14 mg of Sn(Oct)$_2$ (Aldrich Co.) (Sn/Mon=1/40000 (mol/mol)) were put into a 30 mL vial and reacted at a polymerization temperature of 180° C. while changing the polymerization time to give the polylactide resin of Comparative Example 4 (weight average molecular weight: 200,000; acidity: 25 meq/kg) and the polylactide resin of Comparative Example 5 (weight average molecular weight: 235,000; acidity: 22 meq/kg). Test samples were prepared using an injection molder of HAAKE Minijet II for the polylactide resin of Example 8 (weight average molecular weight: 214,000: acidity: 8 meq/Kg) and the polylactide resin of Example 11 (weight average molecular weight: 231,000; acidity: 4 meq/Kg) together with the polylactide resins of Comparative Examples 4 and 5.

These samples were kept at a constant temperature of 60° C. and a constant humidity of 90%, and a degree of maintaining the hydrolysis resistance and mechanical properties was evaluated by measuring the change in tensile strength, the molecular weight, and the acidity over time. The evaluation results are summarized in Table 6.

Referring to Table 6, it was observed that the polylactide resins of the examples having a low initial acidity of 10 meq/kg or less did not undergo any decrease in the molecular weight or deterioration of the mechanical properties such as tensile strength over time even under a severe condition such as a high temperature and high humidity.

In contrast, it was found that although the polylactide resins of the comparative examples having an acidity exceeding 10 meq/kg initially showed a high molecular weight and excellent mechanical properties, they suffered a big decrease in the molecular weight (weight average molecular weight loss: at least 70,000) and significant deterioration of the tensile strength (almost lowered to one third of the initial value) as time passed.

These results are believed to come from the fact that, due to the low acidity of the polylactide resin of the examples, the transesterification reaction or the hydrolysis between the moisture or the acid and the resin with the catalyst residue coupled at its end are suppressed, so that almost neither the decomposition nor the decrease in the molecular weight of the polylactide resin occurs after the polymerization.

The above experimental results ascertain that the polylactide resins of the examples having low acidity of at most 10 meq/kg and a high molecular weight not only have excellent mechanical properties thanks to their high molecular weight but also show superior hydrolysis resistance and maintain such excellent mechanical properties thanks to their low acidity, so that semi-permanent use of the polylactide resin can be realized.

The invention claimed is:

1. A process for preparing a polylactide resin, comprising forming a catalyst composition comprising a complex between a compound of Chemical Formula 2 and a compound of Chemical Formula 3 prior to an initiation of polymerization; and subjecting lactide monomers to ring opening polymerization in the presence of the catalyst composition, wherein

[Chemical Formula 2]

[Chemical Formula 3]

wherein n is an integer of 0 to 15, p is an integer of 0 to 2, M is Sn or Zn, R$^1$ and R$^3$ are the same as or different from each other, and each of them is hydrogen, a substituted or unsubstituted C3 to C10 alkyl, a substituted or unsub-

TABLE 6

|  | Comparative Example 4 | | | Comparative Example 5 | | | Example 8 | | | Example 11 | | |
|---|---|---|---|---|---|---|---|---|---|---|---|---|
|  | | | | | | Hours | | | | | | |
|  | 0 | 10 | 24 | 0 | 10 | 24 | 0 | 10 | 24 | 0 | 10 | 24 |
| Acidity (meq/kg) | 20 | 36 | 55 | 15 | 22 | 48 | 8 | 8 | 10 | 4 | 4 | 5 |
| Molecular Weight (*E-3, g/mol) | 200 | 180 | 125 | 235 | 198 | 139 | 214 | 203 | 195 | 231 | 220 | 206 |
| Tensile strength (Kg * fcm/cm) | 610 | 550 | 220 | 625 | 555 | 230 | 610 | 598 | 550 | 620 | 612 | 590 | stituted C3 to C10 cycloalkyl, or a substituted or unsubstituted C6 to C10 aryl, $R^2$ is a substituted or unsubstituted C3 to C10 alkylene, a substituted or unsubstituted C3 to C10 cycloalkylene, or a substituted or unsubstituted C6 to C10 arylene, and each of X and Y is independently an alkoxy group or a carboxyl group.

2. The process for preparing a polylactide resin according to claim 1, wherein the $MX_pY_{2-p}$ is tin(II) 2-ethylhexanoate $(Sn(Oct)_2)$.

3. The process for preparing a polylactide resin according to claim 1, wherein $R^1$ is a monovalent phenyl group substituted with a C1 to C10 alkyl group or a C3 to C10 alkyl group or cycloalkyl group, and $R^2$ is a divalent phenylene group substituted with a C1 to C10 alkyl group, or a C3 to C10 alkylene group or cycloalkylene group.

4. The process for preparing a polylactide resin according to claim 1, wherein the compounds of Chemical Formula 2 and Chemical Formula 3 are added at a ratio of 0.001 to 0.1 moles with respect to 100 moles of the lactide monomers, respectively.

5. The process for preparing a polylactide resin according to claim 1, wherein the ring opening polymerization is carried out in the presence of an initiator comprising a compound with a hydroxy group.

6. The process for preparing a polylactide resin according to claim 5, wherein the compound with a hydroxy group has 8 or more carbon atoms.

7. The process for preparing a polylactide resin according to claim 5, wherein the initiator is added at a ratio of 0.001 to 1 mole with respect to 100 moles of the lactide monomers.

8. The process for preparing a polylactide resin according to claim 1, wherein the ring opening polymerization is carried out in a manner of a bulk polymerization.

9. The process for preparing a polylactide resin according to claim 1, wherein the ring opening polymerization is carried out at a temperature of 120 to 200° C. for 0.5 to 8 hours.

* * * * *